United States Patent [19]

Duh

[11] 4,238,593

[45] Dec. 9, 1980

[54] METHOD FOR PRODUCTION OF A HIGH MOLECULAR WEIGHT POLYESTER PREPARED FROM A PREPOLYMER POLYESTER HAVING AN OPTIMAL CARBOXYL CONTENT

[75] Inventor: Ben Duh, Tallmadge, Ohio

[73] Assignee: The Goodyear Tire & Rubber Company, Akron, Ohio

[21] Appl. No.: 47,849

[22] Filed: Jun. 12, 1979

[51] Int. Cl.$^3$ .................. C08G 63/26; C07D 211/30
[52] U.S. Cl. .................. 528/272; 528/309; 528/480; 528/481; 560/190; 560/204
[58] Field of Search .............. 528/272, 309, 480, 481; 568/190, 204

[56] References Cited

U.S. PATENT DOCUMENTS

| | | | |
|---|---|---|---|
| 4,154,920 | 5/1979 | Jabarin | 528/272 |
| 4,161,578 | 7/1979 | Herron | 528/272 |
| 4,165,420 | 8/1979 | Rinehart | 528/272 |

*Primary Examiner*—Lucille M. Phynes
*Attorney, Agent, or Firm*—Oldham, Oldham, Hudak & Weber

[57] ABSTRACT

A high molecular weight polyester is produced by a two stage process: a partial melt process until the intrinsic viscosity of the polyester prepolymer reaches from about 0.35 to about 0.62 dl/g, and a solid state polymerization in a static bed until the intrinsic viscosity of the polycondensed polymer reaches at least 0.70 dl/g. The melt process employs greater concentrations of initial acid in combination with a heel or the addition of make-up acid to achieve optimal carboxyl content for the polyester prepolymer capable of use in the static bed solid state polymerization. This prepolymer with an optimal carboxyl content achieves a maximum solid state polymerization rate in a static bed. The production of the high molecular weight polyester by the two stage process minimizes chemical instability and deleterious polymerization byproducts.

45 Claims, 2 Drawing Figures

FIG-1 STATIC BED SOLID POLYMERIZATION RATES OF 0.45 dl/g IV PET PREPOLYMERS

FIG-2

METHOD FOR PRODUCTION OF A HIGH MOLECULAR WEIGHT POLYESTER PREPARED FROM A PREPOLYMER POLYESTER HAVING AN OPTIMAL CARBOXYL CONTENT

BACKGROUND OF THE INVENTION

The present invention relates to a combined melt—solid state polymerization process to produce high molecular weight high purity polyesters. A maximized reaction rate for the solid state polymerization is achieved when the polyester prepolymer has an optimal carboxyl content.

Heretofore, polyesters have been produced by the conventional melt process and have failed to achieve a high molecular weight with minimal acetaldehyde concentrations. These polyesters so produced have generally failed to meet the stringent acetaldehyde content specifications for polyester products used in the production of beverage and food packaging. The acetaldehyde reduces the purity of the polyester product and even affects the contents within the packaging.

The production by a melt process has been the conventional production method for polyesters. For example, U.S. Pat. No. 3,551,386 discloses the process for the production of polyester utilizing the conventional melt process. However, because a conventional melt process has these inherent deficiencies for the production of polyesters for certain commercial and industrial applications, a method for the production of a polyester avoiding these deficiencies is needed.

There have been attempts to produce the polyester by a conventional process in combination with a solid state polymerization. However, the polyester prepolymer produced by the conventional melt process has a very low reaction rate during solid state polymerization, because the carboxyl content of the conventional prepolymer is generally less than 12% of total end group content. Therefore, there must be adjustments to the production of the polyester prepolymer which will maximize the reaction rate in the solid state polymerization by producing a polyester prepolymer with an optimal carboxyl content.

SUMMARY OF THE INVENTION

Therefore, it is an object of the invention to provide a method for the economical production of a high molecular weight, high purity polyester wherein the molecular weight of the polyester exceeds 0.70 dl/g intrinsic viscosity.

An additional object of the invention is to provide a method for the production of a high molecular weight, high purity polyester, as above, which utilizes the melt process to a partial extent and then utilizes a solid state polymerization in a static bed to complete the polycondensation of the polyester.

Another object of the invention is to provide a method for the production of a prepolymer polyester, having an optimal percentage of carboxyl end group content which may maximize the solid state polymerization reaction rate.

It is yet another object of the invention to provide a polycondensed polyester having minimal concentrations of acetaldehyde impurities.

Still an additional object of the invention is to provide a method for the production of a high molecular weight, high purity polyester wherein the optimal carboxyl end group content in the prepolymer polyester maximizes the reaction rate for the solid state polymerization of the polycondensed polyester in the static bed.

These and other objects of the present invention, which will become more apparent as the detailed description of the preferred embodiments proceeds, are achieved by: a method for the production of a high molecular weight, high purity polyester comprising the steps of (a) reacting a glycol and a dicarboxylic compound selected from the group consisting of dicarboxylic acids and dicarboxylic esters to form a polyester prepolymer having an intrinsic viscosity from about 0.35 dl/g to about 0.62 dl/g and having a carboxyl end group content from about 18% to about 40%, said dicarboxylic acids selected from the group consisting of alkyl dicarboxylic acids having a total of from 2 to 16 carbon atoms, and aryl dicarboxylic acids containing a total of from 8 to 16 carbon atoms, said dicarboxylic esters selected from the group consisting of alkyl esters having from 2 to 20 carbon atoms and an alkyl substituted aryl ester having from 10 to 20 carbon atoms, said glycol selected from the group consisting of glycols having 2 to 10 carbon atoms; and (b) polymerizing in a solid state in a static bed, said polyester prepolymer whereby a high molecular weight, high purity polycondensed polyester is formed at a 25%–75% improved average reaction rate, said polycondensed polyester having an intrinsic viscosity of at least 0.70 dl/g and having an acetaldehyde impurity concentration less than about 3.0 parts per million.

DETAILED DESCRIPTION OF THE INVENTION

Polyester prepolymers normally contain carboxyl and hydroxyalkyl end groups. Whenever a polyester prepolyer having a carboxyl end group reacts with a polyester prepolymer having a hydroxyalkyl end group, the condensation reaction produces a polyester of a higher molecular weight with the byproduct of water. The condensation polymerization reaction of these two prepolymers, to form a larger polyester, utilizes the esterification reaction mechanism.

Whenever a polyester prepolymer with a hydroxyalkyl end group reacts with a polyester prepolymer also having a hydroxyalkyl end group, the condensation reaction produces a polyester with a higher molecular weight and a glycol whose alkyl component is the same as the alkyl component in one of the hydroxyalkyl end groups of the smaller polyester precursor. This condensation polymerization reaction utilizes a transesterification reaction mechanism.

The transesterification reaction mechanism and the esterification reaction mechanism both have reversible kinetic properties. Therefore, as the polyester chain increases in the polycondensation reactions, the byproducts of water and glycols must be removed from the esterification reaction and the transesterification reaction, respectively.

It has been found that polyesters of at least 0.70 dl/g intrinsic viscosity, produced by the melt process alone, require high levels of catalyst to maintain an acceptable reaction rate. Moreover, these polyesters of at least 0.70 dl/g intrinsic viscosity contain deleterious byproducts such as acetaldehydes. Both the catalyst contents and the impurities contribute to poor stability and poor color in the final polyester product. Especially, the high concentrations of acetaldehyde generally greater than 35 ppm. create a defect which renders the final product unsuitable for beverage bottle applications.

According to the concepts of the present invention, it has been found that a solid state polymerization following a partial melt process of a prepolymer having optimal carboxyl content unexpectedly achieves a maximized solid state polymerization reaction rate for the polycondensed polyester. The concept of this invention will be suitable for food, medical or beverage packaging applications as well as textile, tire, and other industrial and commercial applications, because of the reduction of acetaldehyde impurities while maintaining economical production.

The solid state polymerization of the polyester prepolymers may be carried out in a static or fluidized bed. The static bed solid state polymerization is preferred because of its lower energy requirements. Typically, catalysts such as antimony, titanium, iron, zinc, cobalt, lead, manganese, niobium, and germanium are utilized in the present invention. Preferably, antimony and titanium are the catalysts used to stimulate polymerization, with titanium being the optimal catalyst for the disclosed method.

Other advantages exist for the use of the solid state polymerization process in a static bed, as a partial replacement of the melt process to achieve a high intrinsic viscosity polymer. Crystallizable polyester or copolyester prepolymers can be further polymerized in a solid phase at temperatures of 5° to 40° C. below their melting points. The effect of the lower temperature in the solid state polymerization process suppresses pyrolysis and other undesirable side reactions which discolor the final polyester product and reduce its stability.

The prepolymer prepared by the conventional melt process polymerizes very slowly in the solid state polymerization because the carboxyl content of generally less than 12% of total end group content is too low for a polymerization rate. It has been found that a prepolymer with an optimal carboxyl content maximizes the solid state polymerization rate. The optimal carboxyl content, between about 18% and 40%, is considerably higher than that of the prepolymer produced by the conventional melt process.

The melt process, as adapted to achieve the objects of the invention, is utilized only to obtain prepolymers having an intrinsic viscosity between about 0.35 and about 0.62 dl/g. It has been found that a prepolymer having an intrinsic viscosity below 0.35 dl/g cannot be adequately pelletized or diced. Also, the lower IV prepolymer will lengthen the solid state polymerization beyond acceptable reaction times. Additionally, it is not economical nor practical to utilize a polyester prepolymer having an intrinsic viscosity greater than 0.62 dl/g. The equipment needed for the production of a high molecular weight polymer from a higher IV prepolymer would be too expensive. Further, excessive degradation reactions including pyrolysis would occur which would deleteriously affect the polyester product.

Preferably, the initial intrinsic viscosity for the partial melt process ranges between about 0.40 dl/g and about 0.60 dl/g. Optimally, the range for the initial intrinsic viscosity of the partial melt process polyester prepolymer is from about 0.45 dl/g to about 0.55 dl/g.

The prepolymer polyesters include polymers formed from dicarboxylic acids and dicarboxylic esters. The dicarboxylic acids may be an alkyl and contain a total of from 2 to 15 carbon atoms. Preferably, the acids are aryl or an alkyl substituted aryl containing from about 8 to about 16 carbon atoms. Specific examples of alkyl dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic (terephthalic) acid, and naphthalic acid. Specific examples of alkyl substituted aryl acids include the various isomers of dimethylphthalic acid, such as dimethylisophthalic acid, dimethylorothophthalic acid and dimethylterephthalic acid; the various isomers of diethylphthalic acid, such as diethylisophthalic acid, diethylorthophthalic acid and diethylterephthalic acid; the various isomers of dimethylnaphthalic acid, such as 2,6-dimethylnaphthalic acid and 2,5-dimethylnaphthalic acid; and the various isomers of diethylnaphthalic acid. Generally, dimethylterephthalic acid is preferred with terephthalic acid being highly preferred.

In lieu of the various dicarboxylic acids, the various esters thereof may be utilized. Thus, the dicarboxylic compound may be an alkyl ester containing a total of from about 2 to 20 carbon atoms, as well as alkyl substituted aryl esters containing from about 10 to about 20 carbon atoms may be utilized. Examples of specific alkyl diesters include dimethyladipate, diethyladipate, and the like. Specific examples of various alkyl substituted aryl diesters include the various isomers of dimethylphthalate, the various isomers of diethylphthalate, the various isomers of dimethylnaphthalate, and the various isomers of diethylnapthalate. Preferably, the various isomers of dimethylphthalate (dimethylterephthalate) are used.

These carboxylic acids or the esters thereof react in the esterification process with a glycol containing from about 2 to 10 carbon atoms. The glycols may be straight-chained or branched. Specific examples include ethylene glycol, propylene glycol, trimethylene glycol, 1,2-butane diol, 1,3-butane diol, 1,4-butane diol, 2,3-butane diol, neopentyl glycol and the like. Of the various glycols, those having from 2 to 8 carbon atoms are preferred, with ethylene glycol and 1,4-butane diol being highly preferred.

A variety of modifications to the partial melt process, used either alone or in combination, are utilized to achieve a prepolymer with the optimal carboxyl content. When dicarboxylic acids and glycol are used as the precursors, the polyester prepolymer can be prepared with or without the use of a heel to speed up the esterification of the acid. The heel is an esterification product recycled to be used to increase the solubility of the dicarboxylic acid and thereby increase the reaction rate of the dicarboxylic acid in the glycol. The use of a heel is explained in U.S. Pat. Nos. 4,020,049 and in 3,427,287 which are both hereby fully incorporated by reference.

When a heel is not used, the glycol/dicarboxylic acid molar charge ratio is usually about 1.2: 1.0 or greater because a lower charge ratio will cause agitation and mixture difficulties. With this ratio, the polyester prepolymer produced will have a carboxyl content far lower than the optimal value and the prepolymer will have a lower reaction rate in the subsequent solid state polymerization. To optimize the carboxyl content of the polyester prepolymer, make-up dicarboxylic acid can be added after partial completion of the esterification of the acid. While it is possible to add the make-up dicarboxylic acid at any time during the later stages of the esterification of the acid, it is desirable to add the make-up acid afer approximately 90%–95% of the acid has been esterified. The amount of make-up dicarboxylic acid to be added is such that the overall glycol to acid molar charge ratio is from about 1.02:1.0 to about 1.15:1.0, and preferably within 1.03:1.0 to about 1.10:1.0. When terephthalic acid is used as the dicarboxylic acid, the charge ratio is preferably from about 1.03:1.0 to 1.10:1.0.

When a heel is used, the heel is first produced by reacting approximately 1.20 moles of glycol with 1.0 moles of dicarboxylic acid. After the esterification of the acid is approximately 95% complete, make-up dicarboxylic acid is added to the heel to adjust the overall glycol/acid molar ratio in the heel to be from about 1.02:1.0 to about 1.15:1.0, the desired molar ratio. After the new heel with the desired molar ratio is esterified within approximately 90%–95% of completion, a batch having from about 1.02:1.0 to about 1.15:1.0 glycol/acid ratio can be charged into the vessel containing the heel. Because of the presence of the heel having the desired molar ratio, there will be no agitation problem with the low glycol/acid charge ratio.

The partial melt process utilizing the dicarboxylic acid, as modified to achieve the low glycol/acid molar ratio, may be carried out under atmospheric or super atmospheric pressures at temperatures between about 240° C. to about 290° C.

If a dicarboxylic ester is used in place of the dicarboxylic acid, no heel is needed for the reaction between the glycol and the dicarboxylic ester, denominated the ester exchange reaction. An ester exchange catalyst such as Mn, Zn, and Ti is needed. The polyester prepolymer produced from the dicarboxylic ester invariably has a very low carboxyl number which has been found to polymerize very slowly in the subsequent solid state polymerization. Again, the carboxyl content of the prepolymer may be optimized by the addition of dicarboxylic acid, in this case for the first time. Because a higher glycol/dicarboxylic ester charge ratio, (e.g. 1.80:1.0–2.20:1.0) ratio is usually used, the dicarboxylic acid can be charged initially with the dicarboxylic ester and the glycol or added after a partial completion of the ester exchange reaction. It has been found that, when using terephthalic acid, dimethylterephthalate, and ethylene glycol, that it is preferred to add the terephthalic acid after the completion (from about 95% to about 100%) of the ester exchange reaction. The molar ratio of dicarboxylic acid to dicarboxylic ester is from about 0.05:1.0 to about 0.50:1.0, and preferably from about 0.10:1.0 to about 0.30:1.0. Whenever terephthalic acid and dimethylterephthalate are used in the preferred embodiment, the molar ratio is preferred to be from about 0.10:1.0 to about 0.30:1.0.

The ester exchange reaction is conducted at atmospheric pressures and at temperatures from about 180° C. to about 250° C. After completion of the ester exchange reaction and the addition of the dicarboxylic acid according to the preferred method, a polycondensation catalyst such as Sb or Ti is added, and the mixture is permitted to react for approximately 10 to 30 minutes.

Whether prepared using the dicarboxylic acid or the dicarboxylic ester, the melt process then enters the partial vacuum stage wherein the atmospheric or super atmospheric pressures of the esterification stage is reduced to sub-atmospheric pressures. A condensation reaction catalyst is added to the prepolymer made from the dicarboxylic acid to begin the partial polycondensation. The addition of the polycondensation catalyst, whether it be Sb, Ti, Fe, Zn, Co, Pb, Mn, Nb, or Ge, is preferably added to the partial melt process prior to the reduction of the atmospheric pressure to sub-atmospheric pressure. The polycondensation reaction continues after pressure has reached a full vacuum of approximately less than 5.0 and preferably less than 1.0 millimeters of mercury, until the desired intrinsic viscosity of between 0.35 and 0.62 dl/g is reached. The desired polycondensation reaction temperature during the imposition of a partial, and later, a full vacuum is between about 260° C. and 290° C. and preferably between 270° C. and 285° C. The prepolymer is then solidified, pelletized or diced, and transferred to the solid state polymerization reactor to complete the static bed polycondensation reactions.

According to the requirements for the size of the prepolymer particles, the pellitizing or dicing processes may produce a usable particle size between about a cube having ⅛ inch sides and a particle to be retained by 20 mesh. Desirably, the particles may pass through 6 mesh and be retained by 12 mesh. Preferably, the particles may pass through 8 mesh and be retained by 10 mesh. The mesh values are determined according to the Tyler Mesh Classification System.

The prepolymer particles are introduced into static bed solid state polymerization reactor. The prepolymer particles must be crystallized and dried for approximately 30 minutes to two hours at a temperature ranging from 140° C. to 180° C. This crystallizing and predrying conditioning of the prepolymer polyester does not significantly change either its intrinsic viscosity nor the carboxyl content. The predrying process uses preheated dry air or inert gases. Desirably, the inert gas may be a high purity argon gas or helium gas, and preferably, may be a high purity nitrogen gas. The inert gas may be used for both the conditioning and the solid state polymerization stages. However, the air can only be used for the conditioning stage.

After the conditioning step, the polyester prepolymer is charged into a static solid state polymerization reactor. A stream of the preheated inert gas is introduced through the bottom of the reactor and passed through the static bed. The inert gas and the static bed temperature is maintained at a temperature from about 200° C. to about 240° C. The polyester prepolymers are maintained within the static bed for a sufficient period of time until the desired product IV from about 0.72 or greater is achieved. The static bed reaction conditions permit the interreaction of the various end groups of the prepolymer polyesters produced by the partial melt process within each particle, such that a polycondensed prepolymer is produced with the byproducts of water and a variety of glycols being released. The reaction byproducts diffuse to the surface of each particle and are carried away by the inert gas. This removal of the byproduct promotes the polycondensation polymerization through both the esterification and transesterification reaction mechanisms.

The reaction rate of the solid state polymerization is dependent upon the polycondensation reaction within each particle, the diffusion of the byproduct from the interior of the particle to the surface of the particle, and the removal of the byproduct from the surface of the particle into the carrier gas. With the particle size and the gas flow rate constant, generally greater than one foot per minute, inside the static bed, the resistances to the diffusions of both reaction byproducts from the surface of the particle into the gas are negligible compared with the resistances to diffusion of both byproducts to the surface of the particle and the resistance to the chemical reactions. Thus, the solid state polymerization in the static bed is controlled by both the chemical reaction rate and the diffusion rate from the interior of the particle to its surface.

It has been found that the transesterification reaction mechanism producing glycol as a byproduct proceeds at a faster reaction rate than the esterification reaction mechanism producing water as a byproduct. Because the transesterification reaction utilizes prepolymers having hydroxyalkyl end groups on both prepolymers, the need for prepolymers having carboxyl end groups is reduced.

Moreover, it has been found that the diffusion of the water byproduct from the esterification reaction mechanism from the interior of the particle to the surface thereof proceeds at a faster rate than the diffusion rate of the glycol byproduct produced by the transesterification reaction mechanism. Because the diffusion rate favors the esterification reaction mechanism, prepolymers having hydroxyalkyl end groups and carboxyl end groups return the need for the prepolymers having carboxyl end groups.

Therefore, the prepolymer polyester must have a carboxyl end group which is neither minimized nor maximized, but optimized therein between.

Phrased in other words, the overall reaction rate for the polycondensation reaction in the solid state polymerization in a static bed is optimized when the carboxyl content in the prepolymer is such as to account for the need for hydroxyalkyl end groups to favor the chemical reaction rate and the need for carboxyl end groups to favor the diffusion rate to the surface of the particle.

Thus, the production of a high molecular weight, high purity polyester is realized using a two-stage melt process-solid state polymerization with prepolymers having optimal carboxyl content between about 18% and about 40% of total end group content. The production of such a polymer achieves the objects of the invention without requiring excess catalyst concentrations, by producing a polyester which has good stability and good color clarity. The appearance of deleterious byproducts such as acetaldehyde in concentrations greater than 3 ppm is significantly reduced.

Substantiation of the two-step process for the production of this improved polyester is found in the following example.

EXAMPLE

A number of nominal 0.45 dl/g IV polyethylene terephthalate polyester prepolymers with carboxyl numbers ranging from 10 to 99 eg/$10^6$ g and containing approximately 5 ppm Ti catalyst were prepared in a 25 lb. reactor. The carboxyl numbers defined is the number of equivalents of carboxyl end groups per $10^6$g of the polyester.

The various batches of ethylene glycol and terephthalic acid were individually charged into an esterification reactor which was operated at 270° C. and 35 psig. The ethylene glycol/terephthalic acid molar charge ratio was 1.20:1.0. After 95% completion of the esterification of the acid, the various esterification products were transferred to a second reactor. In this reactor, various amounts of make-up terephthalic acid were added to the initial charge, and the resultant mixtures were allowed to react under atmospheric pressure for approximately 15 minutes. The make-up terephthalic acid was added to adjust the carboxyl numbers of the prepolymers, each different batch of terephthalic acid having a different amount of make-up TPA to achieve the 10 to 99 eq/$10^6$ g requirements of the experiment. After the reactions of the various amounts of TPA with the various batches, the pressure in the reactor was gradually reduced to below 1.0 millimeters of mercury over a one hour period. Then the reaction temperature was raised to 280° C. and each batch was allowed to further polymerize until the intrinsic viscosity reached 0.45 dl/g. Each prepolymer melt was then extruded through a die at the bottom of each second reactor and pelletized to form cylindrical pellets of 3/32 inch diameter and 1/6 inch length plus or minus 10%.

A small scale glassware static bed reactor, 1¼ inches ID was used to dry and solid state polymerize each batch of prepolymer polyester. Nitrogen was introduced to the bottom of the bed at 30 feet per minutes to remove moisture and other reaction byproducts. The temperature of the bed and the incoming nitrogen was controlled by a dimethylphthalate heating bath. For each run, the prepolymer was dried in the static bed at 160° C. for two hours to reduce the moisture content of the prepolymer below 0.005%. Then the bath temperature was raised to the solid state reaction temperature within 5 minutes and held there until the end of the run. The reaction temperature was fixed at 230° C. The polycondensation and the change in carboxyl number were closely monitored throughout the duration of each run.

Figure 1:
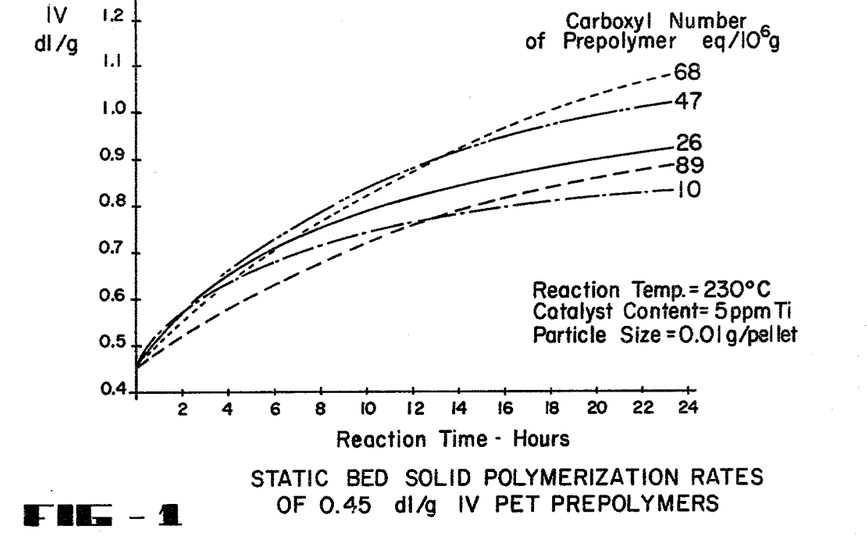
FIG. 1 is a graph of reaction rates resulting from the Example.

The static bed solid state polymerization rates for the 0.45 IV prepolymer polyesters at 230° C. are shown in FIG. 1. It can be seen in the early stage of the solid state polymerization that the prepolymer with a lower carboxyl number polymerizes faster than a prepolymer with a high carboxyl number, and vice versa in the later stage of the solid stage polymerization. In the early stages therefore, the polymerization largely occurs near the surface of the pellet where the reaction byproducts encounter little resistance to diffusion. In such case, the transesterification reaction dominates. As the polymerization proceeds, the end group concentration near the surface decreases and the diffusional rate concomitantly favors the esterification reaction mechanism. From the reaction rate data for the 0.45 IV prepolymer polyester, the reaction time required to produce a higher IV product can be plotted against the prepolymer carboxyl number.

Figure 2:
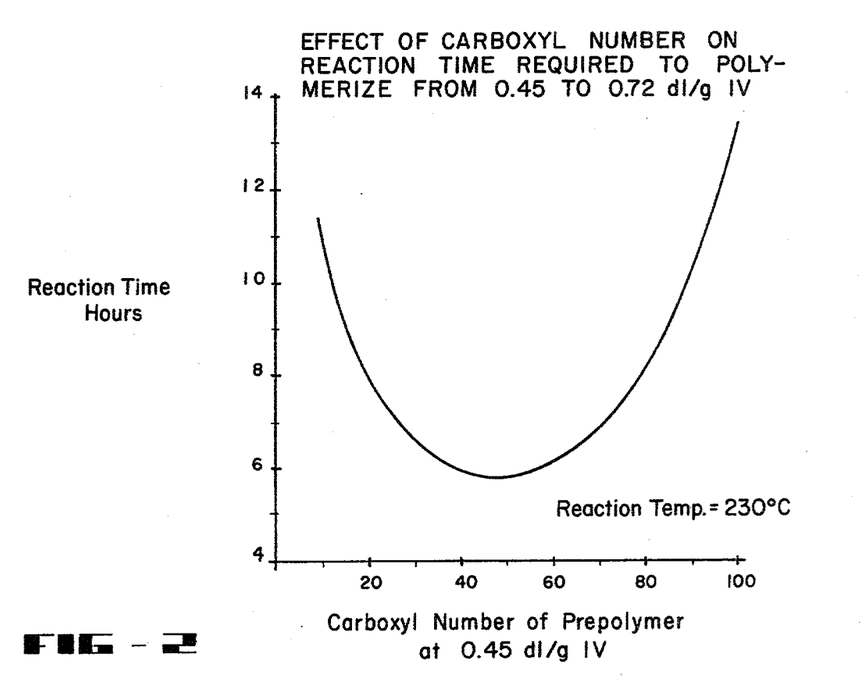
FIG. 2 is a graph comparing carboxyl members with reaction time.

FIG. 2 shows the effect of the carboxyl number of 0.45 IV prepolymer polyester on the reaction time required to produce 0.72 IV product. The reaction time requirement decreases rapidly as the carboxyl number increases from 10 eq/$10^6$g. It reaches a minimum at a carboxyl number of about 48 eq/$10^6$ g or (29.3% of the total end group carboxyl content) and then increases rapidly with further increasing carboxyl number.

The results of the Example and the accompaying figures indicate that the range of carboxyl content should be between about 18% and about 40%, and desirably between about 24% and 33% of total end group content. Desirably, the carboxyl number should range from about between 40 to about 65 eq/$10^6$ g and preferably between from about 40 to about 55 eq/$10^6$ g for a prepolymer having an IV of 0.45 dl/g.

The average reaction rate, and hence the solid state polymerization reaction rate at a particular initial IV level, is determined by the incremental intrinsic viscosity change from initial polyester to product polyester per unit time. Examining FIG. 2, a conventionally produced prepolymer having from about 10-20 eq/$10^6$ g (about 6%-12% carboxyl content) would have an average reaction rate from about 0.027 dl/g-hr. to about 0.033 dl/g-hr. for prepolymer polymerizing from 0.45 IV to 0.72 IV. The average reaction rate for the 0.45 IV prepolymer having optimal carboxyl content polymerizing to 0.72 IV is about 0.041 dl/g-hr. at carboxyl numbers of 30 and 65 eq/$10^6$ g or at carboxyl content of 19% and 39%. The average reaction rate is maximized for the 0.45 IV prepolymer having optimal carboxyl content polymerizing to 0.72 IV at a carboxyl number of 48 eq/$10^6$ g to yield an average reaction rate of about 0.047 dl/g-hr.

Therefore, the prepolymer produced by the present invention process achieves, at a minimum, an average reaction rate 25% better than the average reaction rate for a conventionally produced prepolymer at its best carboxyl content obtainable. At a maximum, the process invented achieves an average reaction rate 43% better than the conventional average reaction rate at its best and about 75% better than the conventional average reaction rate for typical conventional prepolymer carboxyl contents.

The optimum carboxyl end group content, expressed in terms of percentage of total end groups applies for prepolymers within the desired range from about 0.35 dl/g to about 0.62 dl/b. Therefore, the unexpected and enhanced average reaction rates, superior to known average reaction rates, are achieved throughout the desired initial IV range. Because the overall polymerization rate has been maximized, it is economically feasible to produce a high molecular weight, high purity polyester yielding minimal deleterious byproducts and requiring less catalyst than normally used to obtain such a polyester.

While in accordance with the patent statutes, a best mode and method has been presented, it is to be understood that the invention is not to be limited thereto or thereby. Consequently, for an understanding of the scope of the invention, reference is had to the following claims.

What is claimed is:

1. A method for the production of a high molecular weight, high purity polyester comprising the steps of
   (a) reacting a glycol and a dicarboxylic compound selected from the group consisting of dicarboxylic acids and dicarboxylic esters to form a polyester prepolymer having an intrinsic viscosity from about 0.40 dl/g to about 0.62 dl/g and having a carboxyl end group content from about 18% to about 40% of total end groups,
   said dicarboxylic acids selected from the group consisting of alkyl dicarboxylic acids having a total of from 2 to 16 carbon atoms, and aryl dicarboxylic acids containing a total of from 8 to 16 carbon atoms,
   said dicarboxylic esters selected from the group consisting of alkyl esters having from 2 to 20 carbon atoms and an alkyl substituted aryl ester having from 10 to 20 carbon atoms,
   said glycol selected from the group consisting of glycols having 2 to 10 carbon atoms, and
   (b) polymerizing in a solid state in a static bed, said polyester prepolymer so that a high molecular weight, high purity polycondensed polyester is formed, said polycondensed polyester having an intrinsic viscosity of at least 0.70 dl/g and having an acetaldehyde impurity concentration less than about 3.0 parts per million.

2. A method according to claim 1, wherein said prepolymerization reaction comprises a dicarboxylic esterification stage, a partial polycondensation vacuum stage, and a particle preparation stage; and
   wherein said polymerization reaction comprises a drying stage and a solid state polymerization stage.

3. A method according to claim 2, wherein said dicarboxylic compound is a dicarboxylic acid, and said dicarboxylic esterification stage has a reaction temperature from about 240° C. to about 290° C., has a reaction pressure of at least atmospheric pressures, and has a termination when from about 90% to about 95% of said dicarboxylic acid has been esterified by said glycol; and
   wherein said partial polycondensation vacuum stage has a reaction temperature from about 260° C. to about 290° C., has a reaction pressure of at least sub-atmospheric pressures, and has a termination when said polyester prepolymer has an intrinsic viscosity from about 0.40 dl/g to about 0.62 dl/g;
   wherein said drying stage has a temperature from about 140° C. to about 180° C., has a duration from about 30 minutes to about 2 hours, and has a drying gas selected from the class consisting of air, argon, helium, nitrogen, and combinations thereof; and
   wherein said solid state polymerization has a temperature between about 200° C. and 240° C., has a duration until said polycondensed polyester intrinsic viscosity is at least 0.70 dl/g, and has a carrier gas at a flow rate of at least 1 ft. per minute, said carrier gas selected from the group consisting of argon, helium, nitrogen, and combinations thereof, so that a high molecular weight, high purity polycondensed polyester is formed at a 25% to 75% improved average reaction rate.

4. A method according to claim 3, wherein said subatmospheric pressures reach a pressure measuring less than 1.0 mm of mercury;
   wherein said partial polycondensation reaction temperature is from about 270° C. to about 285° C.;
   wherein said drying gas is nitrogen gas; and
   wherein said solid state polymerization stage temperature is from about 220° C. to about 230° C. and said carrier gas is nitrogen gas.

5. A method according to claim 2, wherein said particle preparation stage divides said prepolymer polyester into particles having between ⅛ inch cube diced and +20 Tyler mesh size.

6. A method according to claim 5, wherein said prepolymer particles have a −6 +12 Tyler mesh size.

7. A method according to claim 6, wherein said prepolymer particles have a −8 +10 Tyler mesh size.

8. A method according to claim 3, wherein said polyester prepolymer is formed by a two-stage reaction, said first stage reacting 1.0 moles of dicarboxylic acid and about 1.20 moles of glycol, said first reaction occurring during said dicarboxylic esterification stage and said second stage reacting make-up dicarboxylic acid, such that the overall glycol/dicarboxylic acid molar ratio is from about 1.02:1.0 to about 1.15:1.0, said second stage occurring during said dicarboxylic esterification stage.

9. A method according to claim 3, wherein said polyester prepolymer is formed by a two-stage reaction, said first stage reacting 1.0 moles of dicarboxylic acid and about 1.20 moles of glycol, said first reaction occurring during said dicarboxylic esterification stage and said second stage reacting make-up dicarboxylic acid, such that the overall glycol-dicarboxylic acid molar ratio is from about 1.02:1.0 to about 1.15:1.0, said second stage occurring after said dicarboxylic esterification stage and before said partial condensation vacuum stage.

10. A method according to claims 8 or 9, wherein said second stage adds sufficient make-up dicarboxylic acid, such that the overall glycol/dicarboxylic acid molar ratio is from about 1.03:1.0 to about 1.10:1.0.

11. A method according to claim 3 further comprising the step of forming a prepolymer heel by a reaction of 1.0 moles of dicarboxylic acid and greater than about 1.2 moles of glycol, said heel formation reaction occurring prior to said dicarboxylic esterification stage; and
wherein sufficient dicarboxylic acid is added to said heel to change the overall glycol/dicarboxylic acid molar ratio from about 1.02:1.0 to about 1.15:1.0; and
wherein said polyester prepolymer is formed in said prepolymerization reaction by reacting in the presence of said heel 1.0 moles of dicarboxylic compound and from about 1.02 to about 1.15 moles of said glycol, said reaction occurring during said dicarboxylic esterification stage.

12. A method according to claim 11, wherein said polyester prepolymer formed in the presence of said heel reacts 1.0 moles of dicarboxylic acid and from about 1.03 to about 1.10 moles of said glycol.

13. A method according to claim 10, wherein said dicarboxylic acid is dimethylterephthalic acid and said glycol is 1,4 butane diol.

14. A method according to claim 10, wherein said dicarboxylic acid is terephthalic acid and said glycol is ethylene glycol.

15. A method according to claim 11, wherein said dicarboxylic acid is dimethylterephthalic acid and said glycol is 1,4 butane diol.

16. A method according to claim 2, wherein said dicarboxylic acid is terephthalic acid and said glycol is ethylene glycol.

17. A method according to claim 2, wherein said dicarboxylic compound is a dicarboxylic ester;
wherein said dicarboxylic esterification stage has a reaction temperature from about 180° C. to about 250° C., has a reaction pressure at atmospheric pressures, and has a termination when from about 95% to about 100% of said dicarboxylic ester has been exchanged by said glycol;
wherein said partial polycondensation vacuum stage has a reaction temperature from about 260° C. to about 290° C., has a reaction pressure of at least subatmospheric pressures, and has a termination when said polyester prepolymer has an intrinsic viscosity from about 0.40 dl/g to about 0.62 dl/g;
wherein said drying stage has a temperature from about 140° C. to about 180° C., has a duration from about 30 minutes to about 2 hours, and has a drying gas selected from the class consisting of air, argon, helium, nitrogen, and combinations thereof, and
wherein said solid state polymerization has a temperature between about 200° C. and 240° C., has a duration until said polycondensed polyester intrinsic viscosity is at least 0.70 dl/g, and has a carrier gas at a flow rate of at least 1 ft. per minute, said carrier gas selected from the group consisting of argon, helium, nitrogen and combinations thereof, so that a high molecular weight, high purity polycondensed polyester is formed at a 25% to 75% improved reaction rate.

18. A method according to claim 17, wherein said subatmospheric pressures reach a pressure measuring less than 1.0 mm of mercury;
wherein said partial polycondensation reaction temperature is from about 270° C. to about 285° C.;
wherein said drying gas is nitrogen gas; and
wherein said solid state polymerization stage temperature is from about 220° C. to about 230° C. and said carrier gas is nitrogen gas.

19. A method according to claim 17, wherein said polyester prepolymer is formed by a two-stage process, said first stage reacting 1.0 moles of dicarboxylic ester and from about 1.70 to about 2.20 moles of glycol, said reaction occurring during said dicarboxylic esterification stage;
said second stage reacting with said first stage product, sufficient dicarboxylic acid to form a dicarboxylic acid/dicarboxylic ester molar ratio between about 0.05:1.0 and 0.50:1.0, said second stage occurring during said dicarboxylic esterification stage.

20. A method according to claim 17, wherein said polyester prepolymer is formed by a two-stage process, said first stage reacting 1.0 moles of dicarboxylic ester and from about 1.70 to about 2.20 moles of glycol, said reaction occurring during said dicarboxylic esterification stage;
said second stage reacting sufficient dicarboxylic acid to form a dicarboxylic acid/dicarboxylic ester molar ratio between about 0.05:1.0 and 0.50:1.0, said second stage occurring after said dicarboxylic esterification stage and before said partial polycondensation vacuum stage.

21. A method according to claims 19 or 20, wherein said dicarboxylic acid/dicarboxylic ester molar ratio is between about 0.10:1.0 and 0.30:1.0.

22. A method according to claim 21, wherein said dicarboxylic ester is dimethylterephthalate and said glycol is 1,4 butane diol.

23. A method according to claim 21, wherein said dicarboxylic ester is dimethylterephthalate and said glycol is ethylene glycol.

24. A method according to claim 21, wherein said dicarboxylic acid is terephthalic acid.

25. A polyester prepolymer having an optimal carboxyl content to maximize a subsequent solid state polymerization reaction rate, comprising:
the reaction product of a glycol and a dicarboxylic compound selected from the group consisting of dicarboxylic acids and dicarboxylic esters, said reaction product having an intrinsic viscosity from about 0.40 dl/g to about 0.62 dl/g and having a carboxyl end group content from about 18% to about 40% of total end group,
said dicarboxylic acids selected from the group consisting of alkyl dicarboxylic acids having a total of from 2 to 16 carbon atoms, and aryl dicarboxylic acids containing a total of from 8 to 16 carbon atoms, said dicarboxylic esters selected from the group consisting of alkyl esters having from 2 to 20 carbon atoms and an alkyl substituted aryl ester having from 10 to 20 carbon atoms, said glycol selected from the group consisting of glycols having 2 to 10 carbon atoms.

26. A polyester prepolymer as in claim 25, wherein said reaction product is formed by a prepolymerization reaction process, said process comprising a dicarboxylic esterification stage, a partial polycondensation vacuum stage, and a particle preparation stage.

27. A prepolymer polyester produced according to claim 26, wherein said dicarboxylic compound is a dicarboxylic acid, and said dicarboxylic esterification stage has a reaction temperature from about 240° C. to about 290° C., has a reaction pressure of at least atmospheric pressures, and has a termination when from about 90% to about 95% of said dicarboxylic acid has been esterified by said glycol; and wherein said partial polycondensation vacuum stage has a reaction temperature from about 260° C. to about 290° C., has a reaction pressure of at least subatmospheric pressures, and has a termination when said polyester prepolymer has an intrinsic viscosity from about 0.40 dl/g to about 0.62 dl/g.

28. A prepolymer polyester produced according to claim 27, wherein said subatmospheric pressures reach a pressure measuring less than 1.0 mm of mercury;

wherein said partial polycondensation reaction temperature is from about 270° C. to about 285° C.;

wherein said drying gas is nitrogen gas; and wherein said solid state polymerization stage temperature is from about 220° C. to about 230° C. and said carrier gas is nitrogen gas.

29. A prepolymer polyester produced according to claim 27, wherein said polyester prepolymer is formed by a two-stage reaction, said first stage reacting 1.0 moles of dicarboxylic acid and about 1.20 moles of glycol, said first reaction occurring during said dicarboxylic esterification stage and said second stage reacting make-up dicarboxylic acid, such that the overall glycol/dicarboxylic acid molar ratio is from about 1.02:1.0 to about 1.15:1.0, said second stage occurring during said dicarboxylic esterification stage.

30. A prepolymer polyester produced according to claim 27, wherein said polyester prepolymer is formed by a two-stage reaction, said first stage reacting 1.0 moles of dicarboxylic acid and greater than about 1.20 moles of dicarboxylic acid and greater than about 1.20 moles of glycol, said first reaction occurring during said dicarboxylic esterification stage and said second stage reacting make-up dicarboxylic acid, such that the overall glycol/dicarboxylic acid molar ratio is from about 1.02:1.0 to about 1.15:1.0, said second stage occurring after said dicarboxylic esterification stage and before said partial condensation vacuum stage.

31. A prepolymer polyester produced according to claims 29 or 30, wherein said second stage adds sufficient make-up dicarboxylic acid, such that the overall glycol/dicarboxylic acid molar ratio is from about 1.03:1.0 to about 1.10:1.0.

32. A prepolymer polyester produced according to claim 27 further comprising the step of forming a prepolymer heel by a reaction of 1.0 moles of dicarboxylic acid and about 1.2 moles of glycol, said heel formation reaction occurring prior to said dicarboxylic esterification stage; and wherein sufficient dicarboxylic acid is added to said heel to change the overall glycol/dicarboxylic acid molar ratio from about 1.02:1.0 to about 1.15:1.0; and wherein said polyester prepolymer is formed in said prepolymerization reaction by reacting in the presence of said heel 1.0 moles of dicarboxylic compound and from about 1.02 to about 1.15 moles of said glycol, said reaction occurring during said dicarboxylic esterification stage.

33. A polyester prepolymer produced according to claim 32, wherein said polyester prepolymer formed in the presence of said heel reacts 1.0 moles of dicarboxylic acid and from about 1.03 to about 1.10 moles of said glycol.

34. A polyester prepolymer produced according to claim 31, wherein said dicarboxylic acid is dimethylterephthalic acid and said glycol is 1,4 butane diol.

35. A polyester prepolymer produced according to claim 31, wherein said dicarboxylic acid is terephthalic acid and said glycol is ethylene glycol.

36. A polyester prepolymer produced according to claim 32, wherein said dicarboxylic acid is dimethylterephthalic acid and said glycol is 1,4 butane diol.

37. A polyester prepolymer produced according to claim 33, wherein said dicarboxylic acid is terephthalic acid and said glycol is ethylene glycol.

38. A polyester prepolymer produced according to claim 26, wherein said dicarboxylic compound is a dicarboxylic ester;

wherein said dicarboxylic esterification stage has a reaction temperature from about 180° C. to about 250° C., has a reaction pressure at atmospheric pressures, and has a termination when from about 95% to about 100% of said dicarboxylic ester has been exchanged by said glycol;

wherein said partial polycondensation vacuum stage has a reaction temperature from about 260° C. to about 290° C., has a reaction pressure of at least subatmospheric pressures, and has a termination when said polyester prepolymer has an intrinsic viscosity from about 0.40 dl/g to about 0.62 dl/g;

wherein said drying stage has a temperature from about 140° C. to about 180° C., has a duration from about 30 minutes to about 2 hours, and has a drying gas selected from the class consisting of air, argon, helium, nitrogen, and combinations thereof; and wherein said solid state polymerization has a temperature between about 200° C. and 240° C., has a duration until said polycondensed polyester intrinsic viscosity is at least 0.70 dl/g, and has a carrier gas at a flow rate of at least 1 ft. per minute, said carrier gas selected from the group consisting of argon, helium, nitrogen and combinations thereof.

39. A prepolymer polyester produced according to claim 38, wherein said subatmospheric pressures reach a pressure measuring less than 1.0 mm of mercury;

wherein said partial polycondensation reaction temperature is from about 270° C. to about 285° C.;

wherein said drying gas is nitrogen gas; and wherein said solid state polymerization stage temperature is from about 220° C. to about 230° C. and said carrier gas is nitrogen gas.

40. A polyester prepolymer produced according to claim 38, wherein said polyester prepolymer is formed by a two-stage process, said first stage reacting 1.0 moles of dicarboxylic ester and from about 1.70 to about 2.20 moles of glycol, said reaction occurring during said dicarboxylic esterification stage;

said second stage reacting with said first stage product, sufficient dicarboxylic acid to form a dicarboxylic ester molar ratio between about 0.05:1.0 and 0.50:1.0, said second stage occurring during said dicarboxylic esterification stage.

41. A polyester prepolymer produced according to claim 38, wherein said polyester prepolymer is formed by a two-stage process, said first stage reacting 1.0 moles of dicarboxylic ester and from about 1.70 to about 2.20 moles of glycol, said reaction occurring during said dicarboxylic esterification stage;

said second stage reacting sufficient dicarboxylic acid to form a dicarboxylic acid/dicarboxylic ester molar ratio between about 0.05:1.0 and 0.50:1.0, said second stage occurring after said dicarboxylic esterification stage and before said partial polycondensation vacuum stage.

42. A polyester prepolymer produced according to claims 37 or 38, wherein said dicarboxylic acid/dicarboxylic ester molar ratio is between about 0.10:1.0 and 0.30:1.0.

43. A polyester prepolymer produced according to claim 42, wherein said dicarboxylic ester is dimethylterephthalate and said glycol is 1,4 butane diol.

44. A polyester prepolymer produced according to claim 42, wherein said dicarboxylic ester is dimethylterephthalate and said glycol is ethylene glycol.

45. A polyester prepolymer produced according to claim 42, wherein said dicarboxylic acid is terephthalic acid.

* * * * *

UNITED STATES PATENT OFFICE
CERTIFICATE OF CORRECTION

PATENT NO. : 4,238,593
DATED : 12-9-80
INVENTOR(S) : Ben Duh

It is certified that error appears in the above-identified patent and that said Letters Patent are hereby corrected as shown below:

Col. 15, Line 5, after ylic add: "acid/dicarboxylic"

Signed and Sealed this

Seventh Day of September 1982

[SEAL]

Attest:

Attesting Officer

GERALD J. MOSSINGHOFF

Commissioner of Patents and Trademarks

REEXAMINATION CERTIFICATE (1128th)

United States Patent [19]

Duh

[11] B1 4,238,593

[45] Certificate Issued  Sep. 26, 1989

[54] METHOD FOR PRODUCTION OF A HIGH MOLECULAR WEIGHT POLYESTER PREPARED FROM A PREPOLYMER POLYESTER HAVING AN OPTIMAL CARBOXYL CONTENT

[75] Inventor: Ben Duh, Tallmadge, Ohio

[73] Assignee: The Goodyear Tire and Rubber Company, Akron, Ohio

Reexamination Request:
No. 90/001,508, May 2, 1988

Reexamination Certificate for:
Patent No.: 4,238,593
Issued: Dec. 9, 1980
Appl. No.: 47,849
Filed: Jun. 12, 1979

Certificate of Correction issued Dec. 9, 1980.

[51] Int. Cl.$^4$ ............................................. C08G 63/02
[52] U.S. Cl. .................................. 528/272; 528/308; 528/308.5; 528/308.6; 528/308.8; 528/309; 528/480; 528/481
[58] Field of Search ............... 528/272, 309, 480, 481, 528/308, 308.5, 308.6, 308.8

[56] References Cited

U.S. PATENT DOCUMENTS

| | | | |
|---|---|---|---|
| 3,497,477 | 2/1970 | Barkey et al. | 260/75 |
| 3,778,410 | 12/1973 | Kuhfuss et al. | 260/47 |
| 3,960,817 | 6/1976 | Morawetz et al. | 260/75 M |
| 4,064,112 | 12/1977 | Rothe et al. | |
| 4,150,214 | 4/1979 | Kelley | |
| 4,150,215 | 4/1979 | Kelley | |
| 4,205,157 | 5/1980 | Duh | |
| 4,254,253 | 3/1981 | Brent et al. | |
| 4,271,287 | 6/1981 | Shah | |
| 4,374,975 | 2/1983 | Duh | |
| 4,379,912 | 4/1983 | Hu | |
| 4,387,213 | 6/1983 | Horlbeck et al. | |

FOREIGN PATENT DOCUMENTS

| | | |
|---|---|---|
| 3464271 | 10/1971 | Australia |
| 3464371 | 10/1971 | Australia |
| 5330473 | 3/1973 | Australia |
| 6128373 | 10/1973 | Australia |
| 2365934 | 8/1973 | Fed. Rep. of Germany |
| 2559290 | 12/1975 | Fed. Rep. of Germany |
| 4103471 | 5/1968 | Japan |
| 1678874 | 5/1970 | Japan |
| 3279474 | 12/1970 | Japan |
| 7328878 | 12/1976 | Japan |
| 1004462 | 3/1962 | United Kingdom |
| 1255755 | 4/1969 | United Kingdom |
| 1367138 | 3/1970 | United Kingdom |
| 1371505 | 10/1970 | United Kingdom |
| 1370581 | 10/1974 | United Kingdom |
| 1557337 | 12/1975 | United Kingdom |
| 1515258 | 3/1976 | United Kingdom |
| 1445034 | 8/1976 | United Kingdom |

*Primary Examiner*—John Kight
*Assistant Examiner*—Samuel A. Acquah, III

[57] ABSTRACT

A high molecular weight polyester is produced by a two stage process: a partial melt process until the intrinsic viscosity of the polyester prepolymer reaches from about 0.35 to about 0.62 dl/g, and a solid state polymerization in a static bed until the intrinsic viscosity of the polycondensed polymer reaches at least 0.70 dl/g. The melt process employs greater concentrations of initial acid in combination with a heel or the addition of makeup acid to achieve optimal carboxyl content for the polyester prepolymer capable of use in the static bed solid state polymerization. This prepolymer with an optimal carboxyl content achieves a maximum solid state polymerization rate in a static bed. The production of the high molecular weight polyester by the two stage process minimizes chemical instability and deleterious polymerization byproducts.

STATIC BED SOLID POLYMERIZATION RATES OF 0.45 dl/g IV PET PREPOLYMERS

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-13 and 15-24 is confirmed.

Claims 25-45 were previously disclaimed.

Claim 14 is determined to be patentable as amended.

New claims 46-51 are added and determined to be patentable.

14. A method according to claim [10] *1*, wherein said dicarboxylic acid is terephthalic acid and said glycol is ethylene glycol.

*46. A method according to claim 1 wherein said polyester prepolymer has a carboxyl end group content which is within the range of about 24% to about 33%.*

*47. A method according to claim 1 wherein said polyester prepolymer has an intrinsic viscosity of about 0.45 dl/g; wherein the high molecular weight, high purity polycondensed polyester formed has an intrinsic viscosity of about 0.72 dl/g; and wherein the polymerization in step (b) proceeds at an average reaction rate of about 0.041 dl/g per hour to about 0.047 dl/g per hour.*

*48. A method according to claim 1 wherein the solid state polymerization is done at a temperature which is within the range of about 200° C. to about 240° C.*

*49. A method according to claim 1 wherein the solid state polymerization is done in the presence of a stream of an inert gas; wherein the inert gas is nitrogen; and wherein the nitrogen is preheated.*

*50. The method of claim 1 wherein the carboxyl end group content is selected to attain a rapid solid state polymerization rate.*

*51. The method of claim 50 wherein the carboxyl end group content substantially maximizes the solid state polymerization rate.*

* * * * *

REEXAMINATION CERTIFICATE (2247th)
United States Patent [19]
Duh

[11] B1 4,238,593
[45] Certificate Issued Mar. 22, 1994

[54] METHOD FOR THE PRODUCTION OF A HIGH MOLECULAR WEIGHT POLYESTER PREPARED FROM A PREPOLYMER POLYESTER HAVING AN OPTIONAL CARBOXYL CONTENT

[75] Inventor: Ben Duh, Tallmadge, Ohio

[73] Assignee: The Goodyear Tire & Rubber Company, Akron, Ohio

Reexamination Request:
No. 90/002,391, Jul. 25, 1991

Reexamination Certificate for:
Patent No.: 4,238,593
Issued: Dec. 9, 1980
Appl. No.: 47,849
Filed: Jun. 12, 1979

Certificate of Correction issued Sep. 7, 1982.

[51] Int. Cl.$^5$ .............................................. C08G 63/26
[52] U.S. Cl. ..................................... 528/272; 528/308;
528/308.3; 528/308.5; 528/308.6; 528/308.8;
528/309.1; 528/480; 528/481; 528/503;
560/190; 560/204
[58] Field of Search ...................... 528/272, 308, 308.5,
528/308.6, 308.8, 480, 481, 503, 308.3, 309.1;
560/190, 204

[56] References Cited
U.S. PATENT DOCUMENTS

| | | |
|---|---|---|
| 3,075,952 | 1/1963 | Coover et al. . |
| 3,551,386 | 6/1968 | Berkau et al. ..................... 526/60 |
| 3,671,379 | 6/1972 | Evans et al. . |
| 4,223,128 | 9/1980 | Halek et al. ..................... 528/481 |

FOREIGN PATENT DOCUMENTS
1066162 4/1967 United Kingdom .

OTHER PUBLICATIONS
Ravens et al., "Chemical Reactivity of Polyethylene Terephthalate" Trans. Faraday Soc., 57, 150–9 (1961).

*Primary Examiner*—Sam A. Acquah

[57] ABSTRACT

A high molecular weight polyester is produced by a two stage process; a partial melt process until the intrinsic viscosity of the polyester prepolymer reaches from about 0.35 to about 0.62 dl/g, and a solid state polymerization in a static bed until the intrinsic viscosity of the polycondensed polymer reaches at least 0.70 dl/g. The melt process employs greater concentrations of initial acid in combination with a heel or the addition of makeup acid to achieve optimal carboxyl content for the polyester prepolymer capable of use in the static bed solid state polymerization. This prepolymer with an optimal carboxyl content achieves a maximum solid state polymerization rate in a static bed. The production of the high molecular weight polyester by the two stage process minimizes chemical instability and deleterious polymerization byproducts.

STATIC BED SOLID POLYMERIZATION RATES OF 0.45 dl/g IV PET PREPOLYMERS

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-24 and 46-51 is confirmed.

Claims 25-45 were previously disclaimed.

* * * * *